(No Model.) 2 Sheets—Sheet 2.

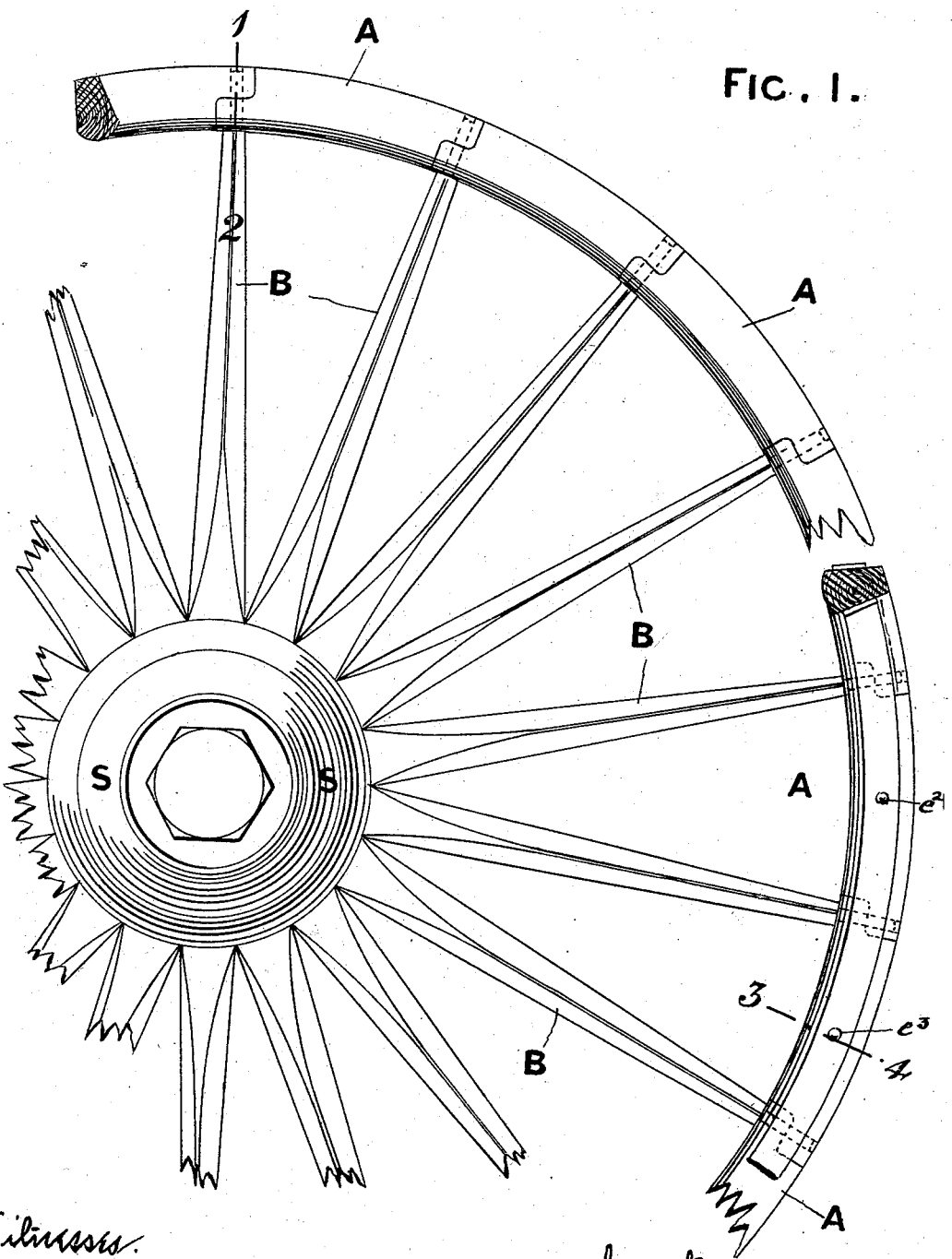

T. GROOM.
WHEEL.

No. 384,033. Patented June 5, 1888.

Witnesses.
Chas. T. Mills.
Herman Niedfeldt.

Inventor.
Thomas Groom.
By Wm. H. Babcock.
Attorney.

UNITED STATES PATENT OFFICE.

THOMAS GROOM, OF HIGHFIELD HOUSE, WELLINGTON, COUNTY OF SALOP, ENGLAND.

WHEEL.

SPECIFICATION forming part of Letters Patent No. 384,033, dated June 5, 1888.

Application filed January 4, 1888. Serial No. 259,800. (No model.)

*To all whom it may concern:*

Be it known that I, THOMAS GROOM, of Highfield House, Wellington, in the county of Salop, England, gentleman, and a subject of the Queen of Great Britain, have invented certain new and useful Improvements in Wheels; and I do hereby declare that the following is a sufficient description of the invention to enable those skilled in the art to which it appertains to carry the same into practical effect.

My invention has for its object improvements in wheels, and has special reference to those constructed of wood fellies and spokes, though the spokes might be made from other material; and the invention is intended to economize the timber used in the fellies, besides adding strength thereto and preventing the liability of breakage, and entirely supersede the end dowels or pegs which are at present used to join the fellies together.

In order that my invention may be clearly understood and easily carried into practice, I have appended hereunto two sheets of drawings, upon which are illustrated a sufficient portion of the wheel to show the invention, with the various details shown separately therefrom.

Figure 3:
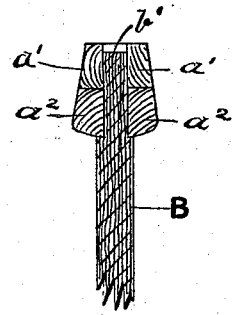
Figure 2:
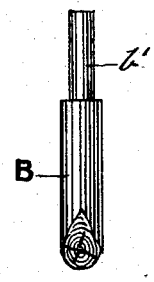
Figure 4:
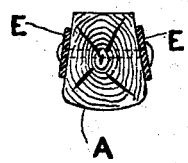
Figure 7:
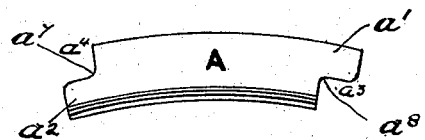
Figure 8:
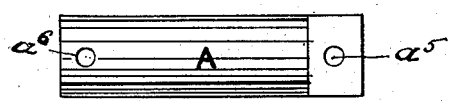
Figure 5:
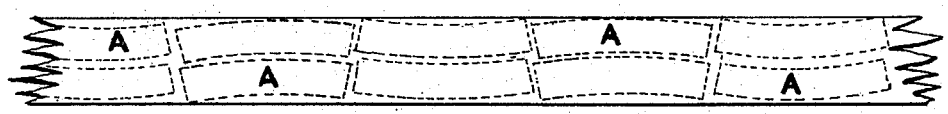
Figure 6:
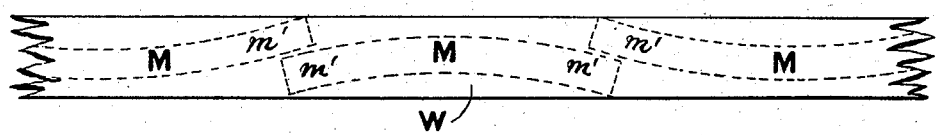

Figure 1, Sheet 1, is a front view of a broken-off portion of wheel, showing the boss S, some of the arms B, and some of the fellies A, with other details hereinafter to be explained. Fig. 2 is a front enlarged view of the upper portion of one of the arms B, showing the round pin $b'$, which is formed in one piece therewith. Fig. 3 is a section on the line 1 2, showing the junction of the fellies A and the arm B. Fig. 4 is a section on the line 3 4, showing the side strengthening-plates, E and E'. Fig. 5 shows part of a board or plank from which fellies are cut, and, indeed, with a number of my fellies A marked upon to be cut. Fig. 6 shows a similar plank or board to the previous figure, but with some of the old kind of fellies marked thereon, ready to be cut. Fig. 7 is a side, enlarged, of one of the fellies A, ready for application in building a wheel. Fig. 8 is an under side plan of the same felly as shown by the previous figure.

The old class of felly is represented by M at Fig. 6, as it required to be sufficiently long to at least embrace two spokes and to extend at each end half-way to another, where it was united by a peg or pin, and thus the length of this felly caused a large piece of timber, W, to be often wasted, besides leaving the parts $m'$ very weak, indeed, because the grain of the timber ran across, and thus any shaky timber was liable to fall into pieces even before the wheel was made. My new felly is represented by A, and is shown marked, ready for sawing out of a board, at Fig. 5, and it will be noticed that there is practically no waste, such as W in Fig. 6, neither does the grain of the timber run across the felly, but each piece is practically or nearly a straight piece.

In the construction of my wheels I take the felly-segment A, Figs. 7 and 8, and notch out the piece $a^3$ at the under side and $a^4$ at the upper side in such a manner as to leave a hollow, $a^7$ and $a^8$, in each corner for strength, and I then bore the holes $a^5$ and $a^6$, thus leaving the halved upper piece, $a'$, with its bored hole $a^5$, and the lower halved piece, $a^2$, with its bored hole $a^6$, and these I make in exact duplicate by accurate machinery, so that each piece is an exact duplicate of every other piece or felly. In regard to the spokes B, I form or turn a pin, $b'$, Figs. 2 and 3, which is sufficiently long to pass through $a^2$ of A and nearly through $a'$ of A, as shown in section at Fig. 3. These pins $b'$ being on every spoke, and the segments or fellies being only just the length to extend between each spoke, there are the same number of fellies as spokes, and the fellies are very simply and very firmly united to each other by the said pins $b'$, and thus each felly acts as a girder resting upon the abutments B, and there are no joints between the spokes at all.

I do not confine myself to wood spokes, because metal ones may be used, either solid or hollow, or the pins $b'$ may be of metal and driven through the parts $a'$ and $a^2$ from the outside into a prepared hole in the spoke, or first driven into the spoke to a gage.

In some cases, to further strengthen the fellies, I may place on each side a ring, E and E', as seen in section at Fig. 4, or I may make each ring in several pieces or plates; but in either case the rivets $e^2$ pass through the plates and the felly to secure the whole together.

When so completed, the outer ring or hoop is shrunk thereon.

Wheels thus made according to my invention economize material and are stronger and much more durable.

What I claim, then, is—

1. The improvements in wheels having fellies halved together at their ends, with the hollowed and rounded corners, and resting at each end upon a spoke, whether wood or metal, with a pin, either separate or fast, passing through each half, substantially as and for the purpose herein set forth.

2. In wheels having fellies halved together at their ends and secured to the spokes by pins passing through them, the combination therewith of circular side plates riveted through the fellies, substantially as herein set forth.

In testimony that I claim the foregoing as my own I affix my name in the presence of two witnesses.

THOMAS GROOM.

Witnesses:
GEORGE PRICE,
GEORGE BARKER.